United States Patent [19]
Engler

[11] Patent Number: 6,082,481
[45] Date of Patent: Jul. 4, 2000

[54] SAFETY RESTRAINT BUCKLE THREE-STATE TONGUE SENSOR

[75] Inventor: Kevin J. Engler, Stephenson, Ill.

[73] Assignee: Honeywell International Inc., Morristown, N.J.

[21] Appl. No.: 09/107,806

[22] Filed: Jun. 30, 1998

[51] Int. Cl.[7] .................................................. B60R 21/00
[52] U.S. Cl. .......................... 180/268; 280/801.1; 24/633
[58] Field of Search ......................... 280/801.1; 180/268, 180/270; 24/303, 633

[56] References Cited

U.S. PATENT DOCUMENTS

| | | |
|---|---|---|
| 4,920,620 | 5/1990 | Yamamoto et al. . |
| 5,742,986 | 4/1998 | Corrion et al. ............................ 24/633 |
| 5,752,299 | 5/1998 | Vivacqua et al. ......................... 24/633 |
| 5,839,174 | 11/1998 | Chammings et al. ..................... 24/633 |
| 5,898,366 | 4/1999 | Brown et al. ......................... 24/633 X |
| 5,915,286 | 6/1999 | Figi et al. . |
| 5,960,523 | 10/1999 | Husby et al. .............................. 24/303 |
| 5,966,784 | 10/1999 | Arbogast et al. .......................... 24/633 |
| 5,970,587 | 10/1999 | Knox ........................................ 24/633 |

Primary Examiner—Brian L. Johnson
Assistant Examiner—Bryan Fischmann
Attorney, Agent, or Firm—Roland W. Norris

[57] ABSTRACT

A safety restraint buckle apparatus and method wherein a Hall element is mounted with respect to a housing and a magnet is mounted with respect to the housing, at a distance from the Hall element. A latch is movably mounted between a latched position and an unlatched position. A tongue is movable between an engaged position within the housing and a disengaged position. In the engaged position of the tongue, the latch is in the latched position. An ejector with a pole piece or a pole member is movably mounted between a loaded position and an unloaded position. When the ejector is in the unloaded position, the Hall element operates in a high magnetic state. When the ejector is in the loaded position and the tongue is in the engaged position, the Hall element operates in a low magnetic state because the magnetic flux density is shunted through the tongue. When the latch is in the latched position and the tongue is in the disengaged position with the ejector thus held in an intermediate position, the Hall element operates in a mid magnetic state, between the low magnetic state and the high magnetic state, to indicate a false positive latch condition of the safety restraint buckle apparatus.

16 Claims, 3 Drawing Sheets

SAFETY RESTRAINT BUCKLE THREE-STATE TONGUE SENSOR

BACKGROUND OF THE INVENTION

1. Field of the Invention

This invention relates to a seat buckle and tongue apparatus having a magnetic flux sensor for determining whether a tongue is securely latched within a housing of the seat buckle and tongue apparatus.

2. Description of Related Art

Known seat buckle and tongue assemblies use sensors which are activated when a tongue is inserted into a housing of the seat belt and tongue assembly, in order to detect whether the tongue is securely latched. Conventional seat buckle and tongue assemblies also use magnets and magnetic flux sensors, including Hall sensors, to detect whether the tongue is securely latched.

Sasaki, U.S. Pat. No. 4,943,087 discloses a conventional seat buckle and tongue assembly with a magnetic flux sensor to detect whether a tongue is within a housing of the seat buckle and tongue assembly by detecting a magnetic flux from a magnet mounted on the tongue and thus the presence of the tongue.

Because the magnetic flux sensor taught by the '087 patent detects a presence of the tongue by sensing magnetic flux, any stray magnetic field can cause the magnetic flux sensor to detect a false positive latch condition, such as when the tongue is either not within the housing or the tongue is not securely latched within the housing.

Saito, U.S. Pat. No. 5,218,744 teaches a magnet and a magnet holder molded or encased around the magnet. The magnet and the magnet holder are mounted on a tongue for use with a conventional seat buckle and tongue assembly which has a magnetic flux sensor. The magnetic flux sensor detects a presence of the tongue within a housing of the seat buckle when the magnet on the tongue is positioned near the magnetic flux sensor. The magnetic flux sensor of the 3 744 patent may therefore detect a false positive latch condition.

Yamamoto et al., U.S. Pat. No. 4,920,620 teaches a mechanical sensor for detecting whether a tongue is inserted within a housing of a seat buckle and tongue assembly. The mechanical sensor moves from a disengaged position to an engaged position when the tongue is inserted within the housing and locked with a latch piece.

Positioning a Hall element near a magnet and using a magnetic flux to activate the Hall element is known. When a vane is introduced between the Hall element and the magnet, it is known that the magnetic flux is shunted in a direction parallel to the vane, and the Hall sensor is electronically placed in an OFF state.

Known sensors for seat buckle and tongue assemblies have several shortcomings. For example, in many conventional seat buckle and tongue assemblies a magnet is mounted on a tongue constructed of a ferrous material. The magnetic draw between the magnet and the tongue makes it difficult to handle the magnet during assembly and thus complicates the manufacturing process. Conventional sensing of the latch for seat buckle and tongue assemblies may accidentally activate indicating a latch condition when the tongue is absent thus creating a false positive latch condition. Many conventional sensors attempt to eliminate the false positive latch condition by using a mechanical sensor in lieu of a magnetic sensor. But, mechanical sensors have more moving parts and thus are less reliable than magnetic sensors. The related art is focused on latch sensing and is subject to false positive conditions if the ejector slides back without the tongue being fastened.

There is an apparent need for an inexpensive seat buckle and tongue apparatus having a magnetic flux sensor that can be easily manufactured. There is also an apparent need for a seat buckle and tongue assembly having a magnetic flux sensor which has three sensing states, one of which is used to detect a false positive latch condition. The three sensing states are usefull for a detecting scheme not centered on detection of the latch.

SUMMARY OF THE INVENTION

It is one object of this invention to provide an inexpensive seat buckle and tongue apparatus having a magnetic flux sensor that is easily manufactured.

It is another object of this invention to sense the presence of a tongue in a latchable position or of the position of components, such as an ejector, in a false latch condition.

It is still another object of this invention to provide a seat buckle and tongue apparatus having a magnetic flux sensor with three sensing states, one of which is used to detect a false positive latch condition.

The sensing capabilities for determining three different operating conditions, according to this invention, are particularly important when interfacing the condition information with passive restraints, such as airbags, and with active restraints, such as seatbelts, to coordinate activation of one or more safety restraints, all in an effort to enhance vehicle safety systems.

The above and other objects of this invention are accomplished in one preferred embodiment of this invention with a sensor, such as a Hall sensor, that detects when a tongue is mounted or securely latched within a housing of a seat buckle and tongue apparatus. An ejector is movably mounted with respect to the housing. The ejector preferably has a pole piece or a pole member positioned nearby to concentrate a magnetic flux density and cause the Hall sensor to operate in a high magnetic state.

The seat buckle and tongue apparatus according to this invention can be used to determine any one of three different operating conditions. In one condition the latch is in an unlatched position, the ejector is in an unloaded position, the tongue is in a disengaged position and the magnetic field is concentrated by the pole member. In another condition, the latch is in a latched position, the ejector is in a loaded position, the tongue is in an engaged position and the magnetic flux density is shunted through the tongue, away from the Hall element. In still another condition, the latch is in the latched position, the tongue is in the disengaged position, the ejector is in an intermediate position and the magnetic flux density has an intermediate magnitude value.

The Hall sensor preferably includes a Hall element and a magnet which are fixedly mounted with respect to the housing. The Hall element is preferably mounted opposite the magnet and is positioned apart from the magnet at a distance that is sufficient to form a magnetic flux density in a direction generally perpendicular to the tongue insertion direction.

The magnetic flux density preferably activates the Hall element so that the Hall sensor operates in a normally high magnetic state. The normally high magnetic state electronically indicates that the tongue is not mounted within the housing and/or that the ejector is in an unloaded or forward position where the pole member concentrates the magnetic flux density on the Hall element.

In one preferred embodiment of this invention, when mounted within the housing the tongue is positioned between the Hall element and the magnet. The tongue is preferably constructed of a ferrous material so that when the tongue is mounted within the housing, the magnetic flux density is shunted from the magnet through the tongue, preferably in a direction generally parallel to the tongue, and the Hall sensor operates in a low magnetic state. The low magnetic state electronically indicates that the tongue is mounted within the housing, the latch is through the tongue opening and in the latched position, and the ejector is in a loaded position with its pole member away from the Hall element.

A bias force preferably urges the ejector towards the unloaded position. When the tongue is unlatched from an engaged position within the housing, the bias force urges the ejector which ejects the tongue from the housing. A pole member is preferably attached to the ejector, such as near a coil spring that supplies the bias force to the ejector. When the ejector is positioned between the Hall element and the magnet, the pole member concentrates the magnetic flux density in a direction generally perpendicular to the tongue insertion direction and operates the Hall sensor in the high magnetic state.

When the tongue is not mounted or latched within the housing but the latch is down or in the latched position, and the ejector is in an unloaded position, the resulting magnetic flux density is present but weakened in a direction generally perpendicular to the tongue because the pole member is not positioned between and aligned with the Hall element and the magnet. Thus the pole member cannot concentrate the entire magnetic flux density in a direction generally perpendicular to the tongue. The resulting magnetic flux density causes the Hall sensor to operate in a mid magnetic state which electronically corresponds to a false positive latch condition, where the tongue is not mounted within the housing, the latch is down or in the latched position, and the ejector is in the partially unloaded or intermediate position.

BRIEF DESCRIPTION OF THE DRAWINGS

The above-mentioned and other features and objects of this invention will be better understood from the following detailed description when taken in view of the drawings wherein.

DESCRIPTION OF PREFERRED EMBODIMENTS

Figure 1:
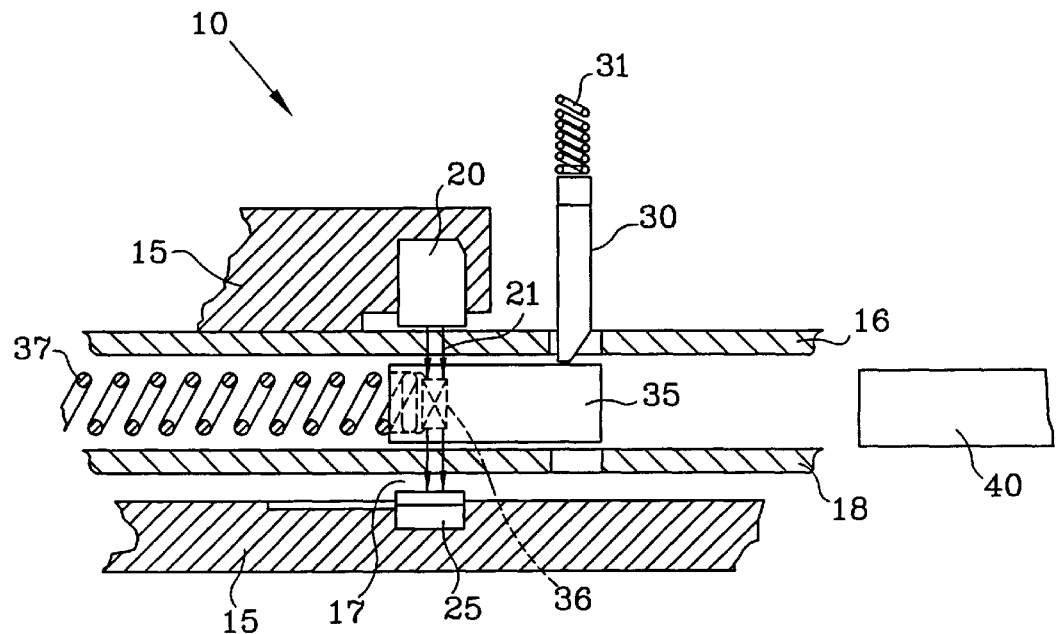
FIG. 1 is a partial cross-sectional side view of a seat buckle and tongue apparatus with an ejector in an unloaded position, a tongue in a disengaged position and a latch in an unlatched position, according to one preferred embodiment of this invention.
Figure 2:
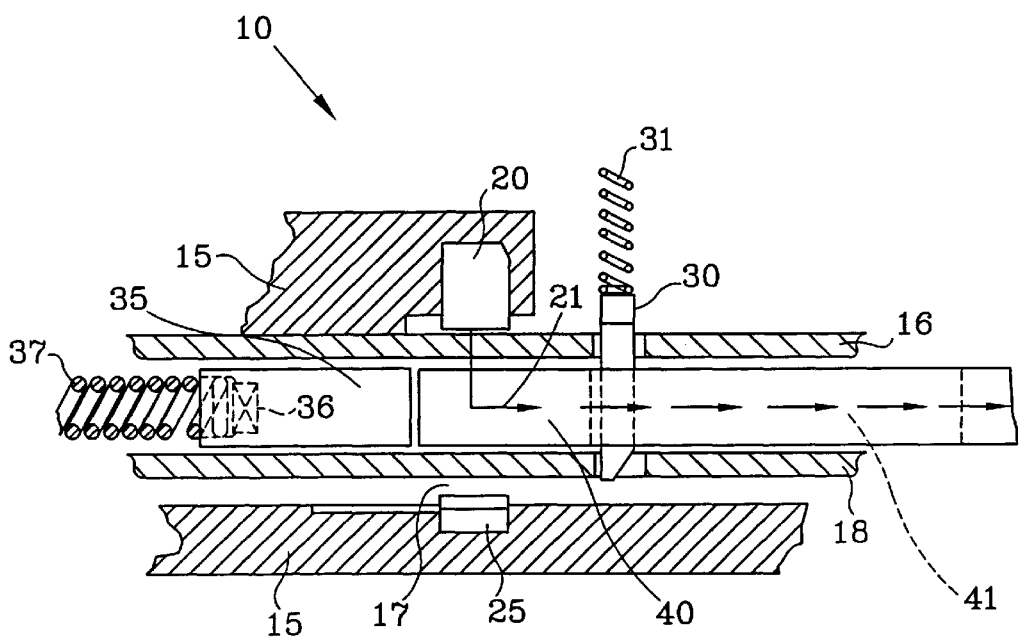
FIG. 2 is a partial cross-sectional side view of the seat buckle and tongue apparatus shown in FIG. 1, with the ejector in a loaded position, the tongue in an engaged position and the latch in a latched position.
Figure 3:
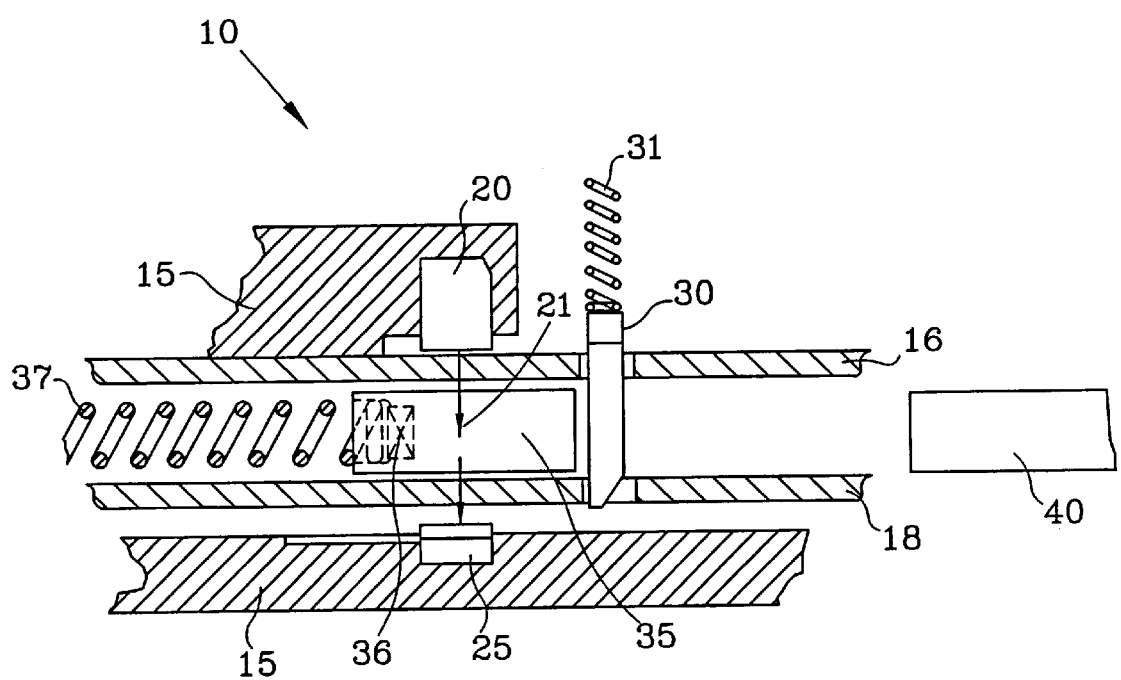
FIG. 3 is a partial cross-sectional side view of the seat buckle and tongue apparatus shown in FIGS. 1 and 2, with the ejector between the loaded position and the unloaded position, the tongue in the disengaged position and the latch in the latched position.

FIGS. 1–3 show three different conditions under which safety restraint buckle 10 of this invention operates. Safety restraint buckle 10 of this invention comprises at least three major moving elements: latch 30 which moves in a vertical direction as shown in FIGS. 1–3; ejector 35 which moves in a horizontal direction as shown in FIGS. 1–3; and tongue 40 which moves in a horizontal direction as shown in FIGS. 1–3.

Safety restraint buckle 10 of this invention can be used to detect at least the three different conditions of safety restraint buckle 10 as shown in FIGS. 1–3. Referring to FIG. 1, latch 30 is in an unlatched position, ejector 35 is in an unloaded position and tongue 40 is disengaged from within housing 15, which corresponds to an unbuckled condition of safety restraint buckle 10. As shown in FIG. 2, latch 30 is in a latched position, ejector 35 is in a loaded position and tongue 40 is in an engaged position, which corresponds to a buckled condition of safety restraint buckle 10. As shown in FIG. 3, latch 30 is in the latched position, ejector 35 is in an intermediate position, a position between the fully unloaded position (FIG. 1) and the filly loaded position (FIG. 2) and tongue 40 is disengaged from within housing 15, which corresponds to a false positive latch condition of safety restraint buckle 10.

In one preferred embodiment according to this invention, safety restraint buckle 10 includes Hall element 25 mounted with respect to housing 15, such as shown in FIGS. 1–3. As shown in FIGS. 1 and 2, magnet 20 is mounted with respect to housing 15, at a distance from Hall element 25, which defines gap 17. Gap 17 is preferably designed to allow sufficient magnetic flux density 21 to activate Hall element 25 when ejector 35 is in an intermediate loaded position (FIG. 3). It is apparent that magnet 20 and/or Hall element 25 can be mounted, secured, connected or otherwise attached, either directly or indirectly, to housing 15, as long as magnet 20 remains stationary with respect to Hall element 25. It is desirable for magnet 20 and/or Hall element 25 to have minimal movement with respect to housing 15. A linear output analog Hall element is preferably used to obtain the three state output as further described below.

FIGS. 1–3 show guide plate 16 and guide plate 18 fixed with respect to housing 15. Guide plates 16,18 preferably guide movement of ejector 35 and/or tongue 40. Also as shown in FIGS. 1–3, guide plates 16,18 have openings within which latch 30 moves between the unlatched position as shown in FIG. 1 and the latched position as shown in FIG. 2. It is apparent that other structural members can be used to accomplish the same result of moving latch 30, ejector 35 and/or tongue 40 within the scheme of the present invention.

As shown in FIGS. 1–3, magnet 20 is positioned generally opposite Hall element 25. Although magnet 20 and Hall element 25 are preferably aligned with respect to each other, such as shown in FIGS. 1–3, it is apparent that any other suitable physical arrangement can be used, as long as magnet 20 cooperates with Hall element 25 so that magnetic flux density 21 activates and operates Hall element 25, depending upon the desired condition of safety restraint buckle 10.

As shown in FIGS. 1–3, latch 30 is movably mounted with respect to housing 15. Latch 30 is movable between the latched position and the unlatched position. As shown in FIG. 1 ejector 35 holds latch 30 up, spring 31 compresses and provides a potential bias force urging latch 30 towards the latched position. As shown in FIGS. 2 and 3, ejector 35 is in the loaded position and the intermediate position, respectively, and elongated spring 31 moves latch 30 into the latched position. It is apparent that any other suitable spring element that produces a bias force can be used to urge element 30 into the latched position.

Figure 4:
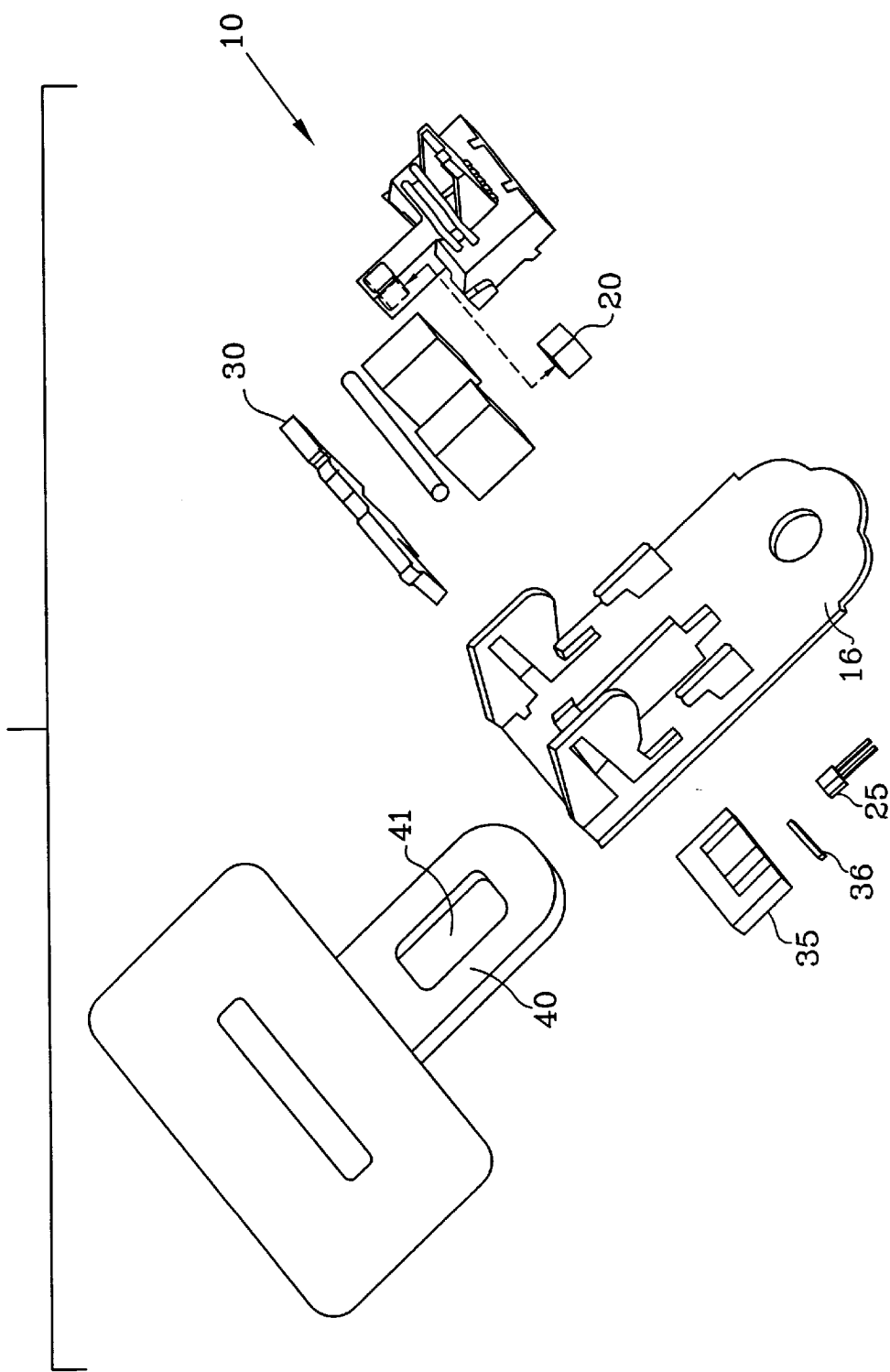
FIG. 4 is an exploded perspective view of a seat buckle sensor and tongue apparatus, according to one preferred embodiment of this invention.

As shown in FIGS. 1–3, tongue 40 is insertable within housing 15 and movable between an engaged position, as shown in FIG. 2, and a disengaged position, as shown in FIGS. 1 and 3. In the engaged position of tongue 40, latch 30 is in the latched position. As shown in FIGS. 2 and 4, tongue 40 has therein an opening 41. As shown in FIG. 2, with tongue 40 in the engaged position, latch 30 projects within opening 41 and interferes with tongue 40 to prevent tongue 40 from disengaging from within housing 15.

Ejector 35 is movably mounted with respect to housing 15. A user selectively operates ejector 35 to eject tongue 40 from the engaged position within housing 15 to the disengaged position. Ejector 35 is movable between the loaded position, such as shown in FIG. 2, and the unloaded position, such as shown in FIG. 1. In FIG. 3, ejector 35 is positioned between the fully loaded position as shown in FIG. 2 and the fully unloaded position as shown in FIG. 1. Ejector 35 is preferably biased towards the unloaded position. As shown in FIGS. 1–3, spring 37 is used to provide such bias force. However, it is apparent that any other suitable spring element or other mechanical element that supplies a bias force can be used to urge ejector 35 towards the unloaded position.

In a condition where ejector 35 is in the unloaded position, Hall element 25 operates in a high magnetic state. In one preferred embodiment according to this invention, Hall element 25 normally operates in the high magnetic state. The high magnetic state preferably corresponds to an unbuckled condition where latch 30 is in the unlatched position and tongue 40 is in the disengaged position. Hall element 25 can be combined with any suitable signal conditioning electronics, which alters, limits and/or controls an output signal, to form a Hall effect transducer. The output signal can be emitted to any suitable controller, such as for indicating a particular condition of safety restraint buckle 10, such as one of the different conditions shown in FIGS. 1–3.

With ejector 35 in the loaded position, Hall element 25 operates in a low magnetic state when tongue 40 is in the engaged position, such as shown in FIG. 2, and Hall element 25 operates in a mid magnetic state when tongue 40 is in the disengaged position and ejector 35 is in an intermediate position, such as shown in FIG. 3.

When Hall element 25 operates in the low magnetic state, latch 30 is in the latched position, as shown in FIG. 2. When Hall element 25 operates in the mid magnetic state, latch 30 is also in the latched position, as shown in FIG. 3.

In the unloaded position as shown in FIG. 1, ejector 35 is positioned between Hall element 25 and magnet 20. In one preferred embodiment of this invention as shown in FIG. 1, safety restraint buckle 10 comprises pole member 36 mounted, connected, secured or otherwise attached to ejector 35. As shown in FIG. 1, in the unloaded position of ejector 35, pole member 36 is generally aligned with magnet 20 and Hall element 25. Pole member 36 concentrates magnetic flux density 21 and thereby causes Hall element 25 to operate in the high magnetic state. As shown in FIG. 1, in one preferred embodiment of this invention, pole member 36 is positioned between Hall element 25 and magnet 20.

As shown by the different conditions of FIGS. 1–3, the Hall effect transducer of safety restraint buckle 10 of this invention can emit an output signal which can vary as a function of the different conditions shown in FIGS. 1–3. For example, as shown in FIG. 1, the output signal may contain information emitted to and alerting a receiver that latch 30 is in the unlatched position, ejector 35 is in the unloaded position and tongue 40 is in the disengaged position, because the magnetic field is concentrated by pole member 36. As another example, as shown in FIG. 2, the output signal may contain information emitted to and alerting the receiver that latch 30 is in the latched position, ejector 35 is in the loaded position and tongue 40 is in the engaged position, because magnetic flux density 21 is shunted through tongue 40 and away from Hall element 25. In the embodiment shown in FIG. 2, Hall element 25 is not activated or is activated but operates Hall element 25 in the low magnetic state. As still another example, as shown in FIG. 3, the output signal may contain information that corresponds to latch 30 in the latched position, tongue 40 in the disengaged position and ejector 35 in a position between the fully loaded position and the fully unloaded position as shown in FIGS. 2 and 1, respectively. As illustrated in FIG. 3, magnetic flux density 21 reaching Hall element 25 has a magnitude between the magnitude illustrated in FIG. 1 and the magnitude illustrated in FIG. 2, because as shown in FIG. 3 pole member 36 is not aligned with magnet 20 and Hall element 25.

Thus, the three conditions shown in FIGS. 1–3 can be used to convey information to a receiver. As shown in FIG. 1, the information can communicate that tongue 40 is in the disengaged position and latch 30 is in the unlatched position, which corresponds to an unbuckled safety restraint buckle 10. As shown in FIG. 2, the information can communicate that tongue 40 is in the engaged position and latch 30 is in the latched position, which corresponds to a buckled safety restraint buckle 10. Also, as shown in FIG. 3, the information can communicate that tongue 40 is in the disengaged position and latch 30 is in the latched position, which corresponds to a false positive latch condition of safety restraint buckle 10.

The three different operating conditions that can be achieved with safety restraint buckle 10 of this invention is advantageous for sensing not only a buckled or an unbuckled condition, but also a false positive condition wherein a receiver would otherwise believe that the condition shown in FIG. 3 corresponds to a buckled condition. The sensing capabilities of the apparatus and method of this invention are particularly important when interfacing the condition information with passive restraints, such as airbags, and with active restraints, such as seatbelts, to coordinate activation of one or more safety restraints, all in an effort to enhance vehicle safety systems.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A safety restraint buckle apparatus comprising:
   (a) a housing;
   (b) a Hall element mounted to the housing;
   (c) a magnet mounted to the housing at a distance from the Hall element;
   (d) a latch movably mounted with respect to the housing, the latch movable between a latched position and an unlatched position;
   (e) a tongue insertable within the housing and movable between an engaged position and a disengaged position, in the engaged position of the tongue the latch being in the latched position; and
   (f) an ejector movably mounted with respect to the housing, the ejector movable between a loaded position and an unloaded position such that with the ejector in the unloaded position the Hall element operates in a high magnetic state, and with the ejector in the loaded position the Hall element operates in a low magnetic state when the tongue is in the engaged position, and with the latch in the latched position and the ejector in an intermediate position the Hall element operates in a mid magnetic state when the tongue is in the disengaged position.

2. A safety restraint buckle apparatus according to claim 1 wherein the distance from the Hall element to the magnet is selected to provide a magnetic flux density which activates the Hall element.

3. A safety restraint buckle apparatus according to claim 1 wherein the Hall element and the magnet are positioned generally opposite each other.

4. A safety restraint buckle apparatus according to claim 1 wherein the Hall element and the magnet form a gap within which the tongue is insertable.

5. A safety restraint buckle apparatus according to claim 1 wherein the ejector is biased towards the unloaded position.

6. A safety restraint buckle apparatus according to claim 1 wherein when the Hall element operates in the high magnetic state the latch is in the unlatched position.

7. A safety restraint buckle apparatus according to claim 6 wherein when the Hall element operates in the high magnetic state the tongue is in the disengaged position.

8. A safety restraint buckle apparatus according to claim 1 wherein when the Hall element operates in the low magnetic state the latch is in the latched position, the tongue is in the engaged position and the ejector is in the loaded position.

9. A safety restraint buckle apparatus according to claim 1 wherein in the unloaded position the ejector is positioned between the Hall element and the magnet.

10. A safety restraint buckle apparatus according to claim 9 further comprising a pole member attached to the ejector.

11. A safety restraint buckle apparatus according to claim 10 wherein in the unloaded position of the ejector at least a portion of the pole member is positioned between the Hall element and the magnet.

12. A method for detecting whether a tongue is engaged within a housing of a safety restraint buckle apparatus, the method comprising:
   a) moving the tongue with respect to the housing, between an engaged position within the housing, wherein the tongue is positioned between a Hall element and a magnet, and a disengaged position;
   b) moving a latch with respect to the housing, between a latched position and an unlatched position;
   c) moving an ejector with respect to the housing, between a loaded position and an unloaded position;
   d) with the ejector in the unloaded position operating the Hall element in a high magnetic state; and
   e) with the ejector in the loaded position, operating the Hall element in a low magnetic state when the tongue is in the engaged position and in a mid magnetic state when the tongue is in the disengaged position.

13. In a method according to claim 12 wherein a magnetic flux density between the magnet and the Hall element activates the Hall element thereby normally operating the Hall element in the high magnetic state.

14. In a method according to claim 12 wherein the tongue is in the disengaged position when the Hall element operates in the high magnetic state.

15. In a method according to claim 12 wherein the latch is in the unlatched position when the Hall element operates in the high magnetic state.

16. In a method according to claim 12 wherein the latch is in the latched position when the Hall element operates in the low magnetic state or the mid magnetic state.

* * * * *